(12) United States Patent
Cooley et al.

(10) Patent No.: US 8,177,125 B1
(45) Date of Patent: May 15, 2012

(54) AUTOMATIC ONLINE CHECKOUT VIA MOBILE COMMUNICATION DEVICE WITH IMAGING SYSTEM

(75) Inventors: Shaun Cooley, El Segundo, CA (US); Charles Andrew Payne, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 42 days.

(21) Appl. No.: 12/969,510

(22) Filed: Dec. 15, 2010

(51) Int. Cl.
*G06Q 40/00* (2006.01)
*G06F 17/00* (2006.01)
(52) U.S. Cl. ........................................ 235/379; 235/375
(58) Field of Classification Search .................. 235/379, 235/375; 705/26.1–26.9, 27.1, 27.2, 16
See application file for complete search history.

(56) References Cited

U.S. PATENT DOCUMENTS

| | | | |
|---|---|---|---|
| 2011/0208659 A1* | 8/2011 | Easterly et al. ................. | 705/79 |
| 2011/0307318 A1* | 12/2011 | LaPorte et al. ............. | 705/14.33 |
| 2011/0313870 A1* | 12/2011 | Eicher et al. .................... | 705/16 |
| 2012/0012649 A1* | 1/2012 | Hsu ............................... | 235/375 |

* cited by examiner

*Primary Examiner* — Jamara Franklin
(74) *Attorney, Agent, or Firm* — Brill Law Office; Jeffrey Brill (57) ABSTRACT

A graphical checkout identifier is used to facilitate automatic checkout of a user on a webstore. A graphical identifier checkout system receives a request from a webstore for a onetime use graphical checkout identifier. In response to the received request, a onetime use graphical checkout identifier to be displayed by the webstore is generated. A request for checkout completion information by the webstore is encoded in the graphical checkout identifier, which is transmitted to the webstore for display. The onetime use graphical checkout identifier being displayed by the webstore is captured by a registered user operated computing device. In response, the requested checkout completion information is transmitted to the webstore, such that the user is automatically checked out on the webstore, without the user manually logging in to the webstore or entering the requested checkout completion information.

20 Claims, 6 Drawing Sheets

AUTOMATIC ONLINE CHECKOUT VIA MOBILE COMMUNICATION DEVICE WITH IMAGING SYSTEM

TECHNICAL FIELD

This disclosure pertains generally to computer security, and more specifically to using graphical identifiers for automatic online checkout.

BACKGROUND

U.S. online retail sales is estimated to reach $248.7 billion by 2014, up more than $60 billion from 2010. Despite the prevalence of online sales, completing an online purchase still requires users to type in their name, email address, credit card information, and shipping details. To make matters worse, most online retailers require users to create accounts on their site, which adds yet another step and more data entry to the process for the user. Furthermore, every time a user enters such information to facilitate an online purchase, the user's credentials are exposed to misappropriation by malware, key loggers and phishing websites.

Some online retailers allow users with accounts to store payment and shipping information, and choose from previously entered options after having logged into the webstore. However, users still need to reenter this information for each separate online merchant, and they need to login to each specific webstore each time they wish to make a purchase. Paypal and Google have alleviated this problem to some extent by allowing users to enter their identifying, payment and shipping information one time, and then choosing Paypal or Google Checkout to complete online transactions with multiple webstores. These services allow a user to choose payment and shipping details from menus, and provide the webstore with notification of payment along with the user's shipping details. Paypal and Google Checkout are a big step forward over having to enter this information individually for each purchase at each webstore, but they still fail to provide a means for checkout that does not require users to login each time they make a purchase. For example, a customer can visit a webstore, add items to his or her cart, choose checkout, and then select the Paypal or Google Checkout option. At this point, the user must login to his or her Paypal or Google Checkout account, requiring manual entry of the username and password each time the user makes a purchase.

It would be desirable to address these issues.

SUMMARY

A graphical identifier checkout system uses a graphical checkout identifier to facilitate the automatic checkout of a user on a store. The graphical identifier checkout system receives a request from a webstore for a onetime use graphical checkout identifier. In some embodiments, the request from the webstore identifies the specific checkout completion information being requested by the webstore. In response to the received request, a onetime use graphical checkout identifier to be displayed by the webstore is generated. A request for checkout completion information by the webstore is encoded in the graphical checkout identifier. In some embodiments, this further comprises encoding an identification of the specific checkout completion information being requested by the webstore in the graphical checkout identifier. In any case, the generated graphical checkout identifier is transmitted to the webstore for display (e.g., on a checkout screen).

The onetime use graphical checkout identifier being displayed by the webstore is captured by a registered user operated computing device (e.g., a mobile communication device). In response, the requested checkout completion information is transmitted to the webstore, such that the user is automatically checked out on the webstore, without the user manually logging in to the webstore or entering the requested checkout completion information. More specifically, the graphical identifier checkout system receives a request from the user operated computing device to automatically complete the checkout of the user on the webstore, responsive to the user operated computing device having captured the onetime use graphical checkout identifier being displayed by the webstore. In some embodiments, the request received from the user operated computing device includes the specific checkout completion information requested by the webstore. In other embodiments, the request specifies what checkout completion information is being requested by the webstore, without including the checkout completion information itself.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
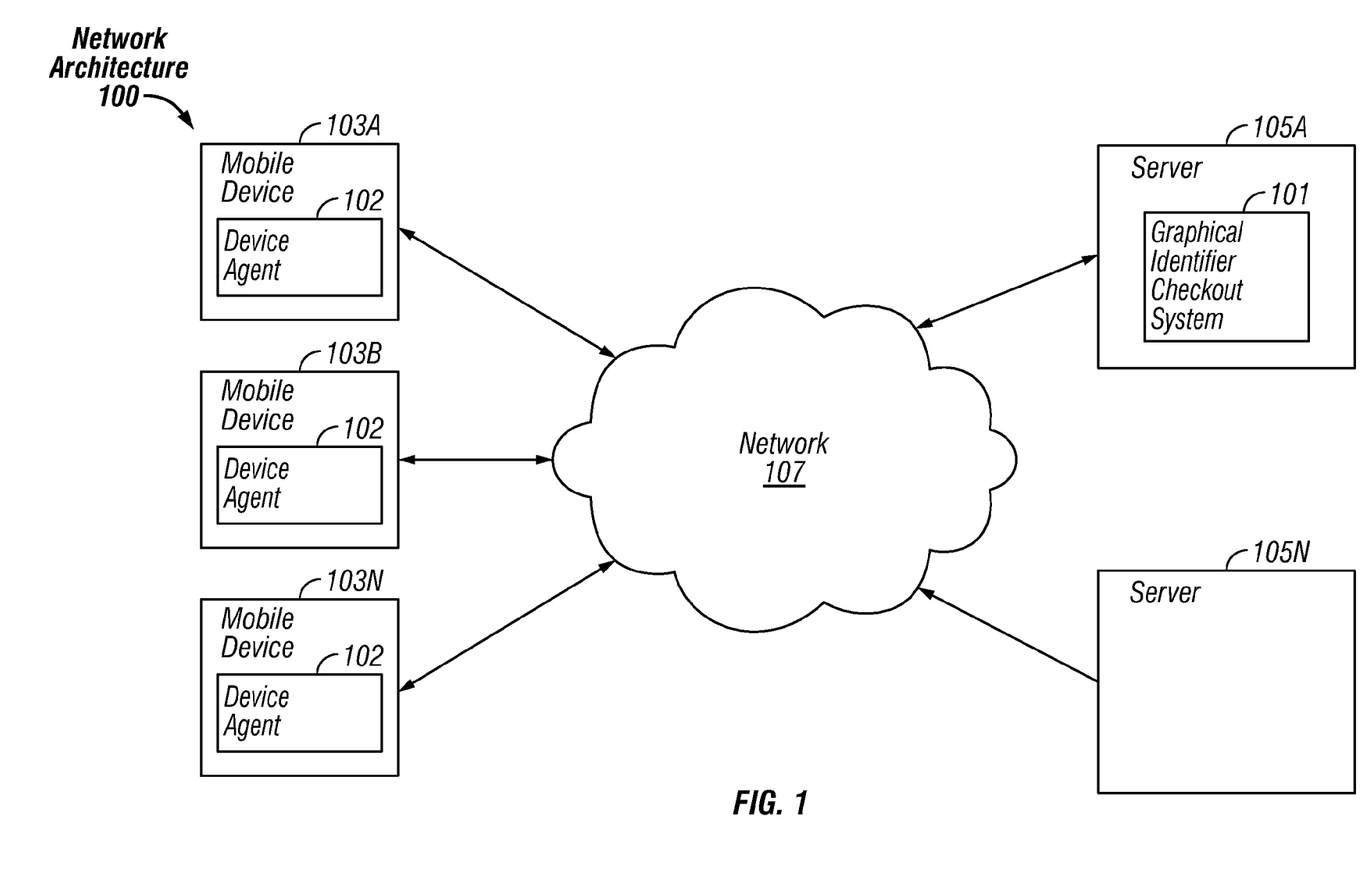
FIG. 1 is a block diagram of an exemplary network architecture in which a graphical identifier checkout system can be implemented, according to some embodiments.

FIG. 1 is a block diagram illustrating an exemplary network architecture 100 in which a graphical identifier checkout system 101 can be implemented. The illustrated network architecture 100 comprises multiple mobile communication devices 103A, 103B and 103N, as well as multiple servers 105A and 105N. In FIG. 1, the graphical identifier checkout system 101 is illustrated as residing on server 105A, with a device agent 102 thereof on each mobile communication device 103. It is to be understood that this is an example only, and in various embodiments various functionalities of this system 101 can be instantiated on a mobile communication device 103, a server 105 or can be distributed between multiple computing devices as desired.

It is to be understood that the mobile communication devices 103 described herein comprises portable computer systems 210 capable of connecting to a network 107 and running applications (such mobile communication devices 103 are sometimes referred to as smart-phones, but even many mobile phones not so designated have these capabilities). Mobile communication devices 103 and servers 105 can be implemented using computer systems 210 such as the one illustrated in FIG. 2 and described below. The mobile communication devices 103 and servers 105 are communicatively coupled to a network 107, for example via a network interface 248 as described below in conjunction with FIG. 2. Mobile communication devices 103 are able to access applicants and/or data on servers 105 using, for example, a web browser or other client software (not shown).

Although FIG. 1 illustrates three mobile communication devices 103 and two servers 105 as an example, in practice many more (or fewer) mobile communication devices 103 and/or servers 105 can be deployed. In one embodiment, the network 107 is in the form of the internet. Other networks 107 or network-based environments can be used in other embodiments.

Figure 2:
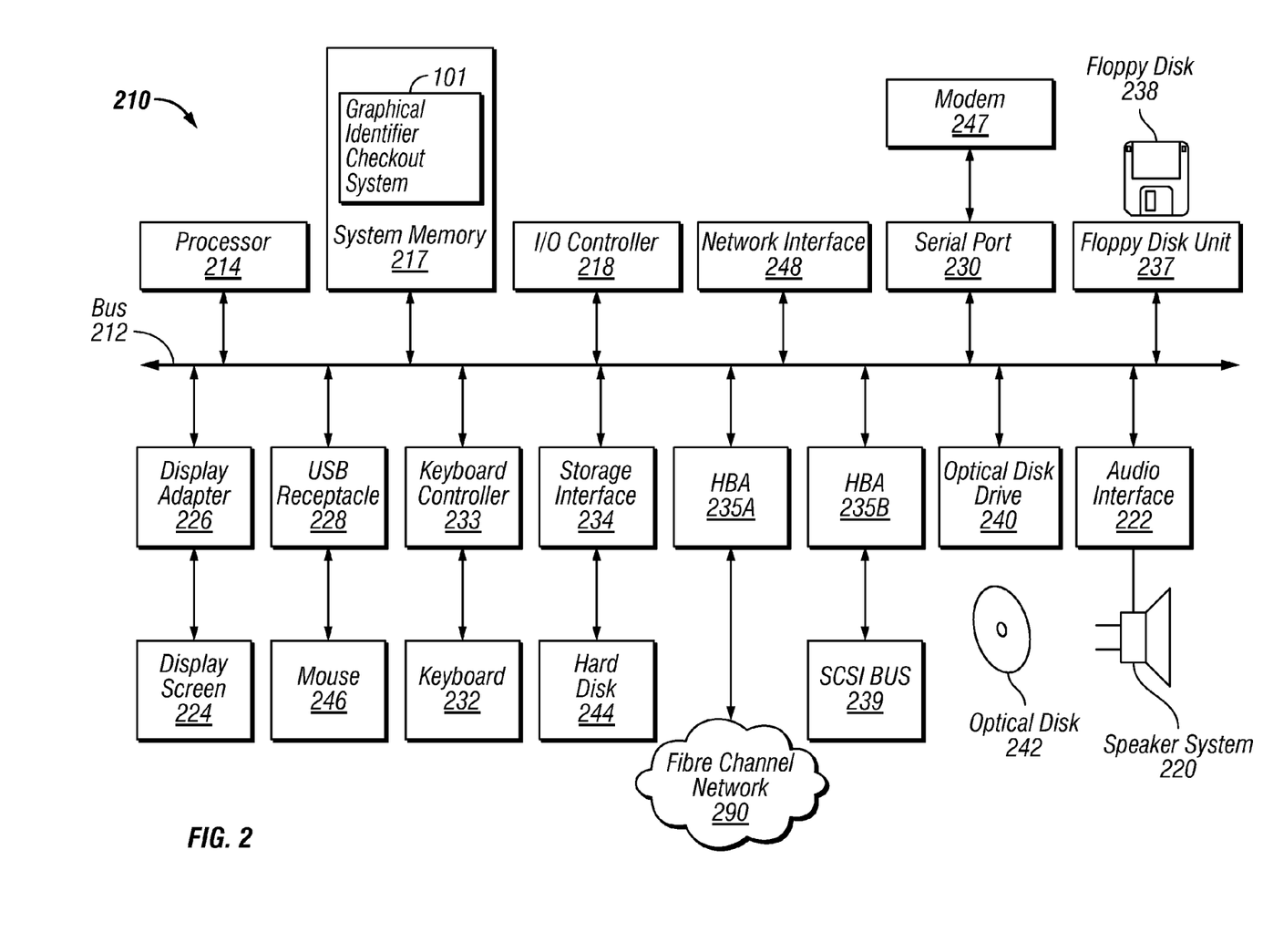
FIG. 2 is a block diagram of a computer system suitable for implementing a graphical identifier checkout system, according to some embodiments.

FIG. 2 is a block diagram of a computer system 210 suitable for implementing a graphical identifier checkout system 101. Both mobile communication devices 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the graphical identifier checkout system 101 is illustrated as residing in system memory 217. The workings of the graphical identifier checkout system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
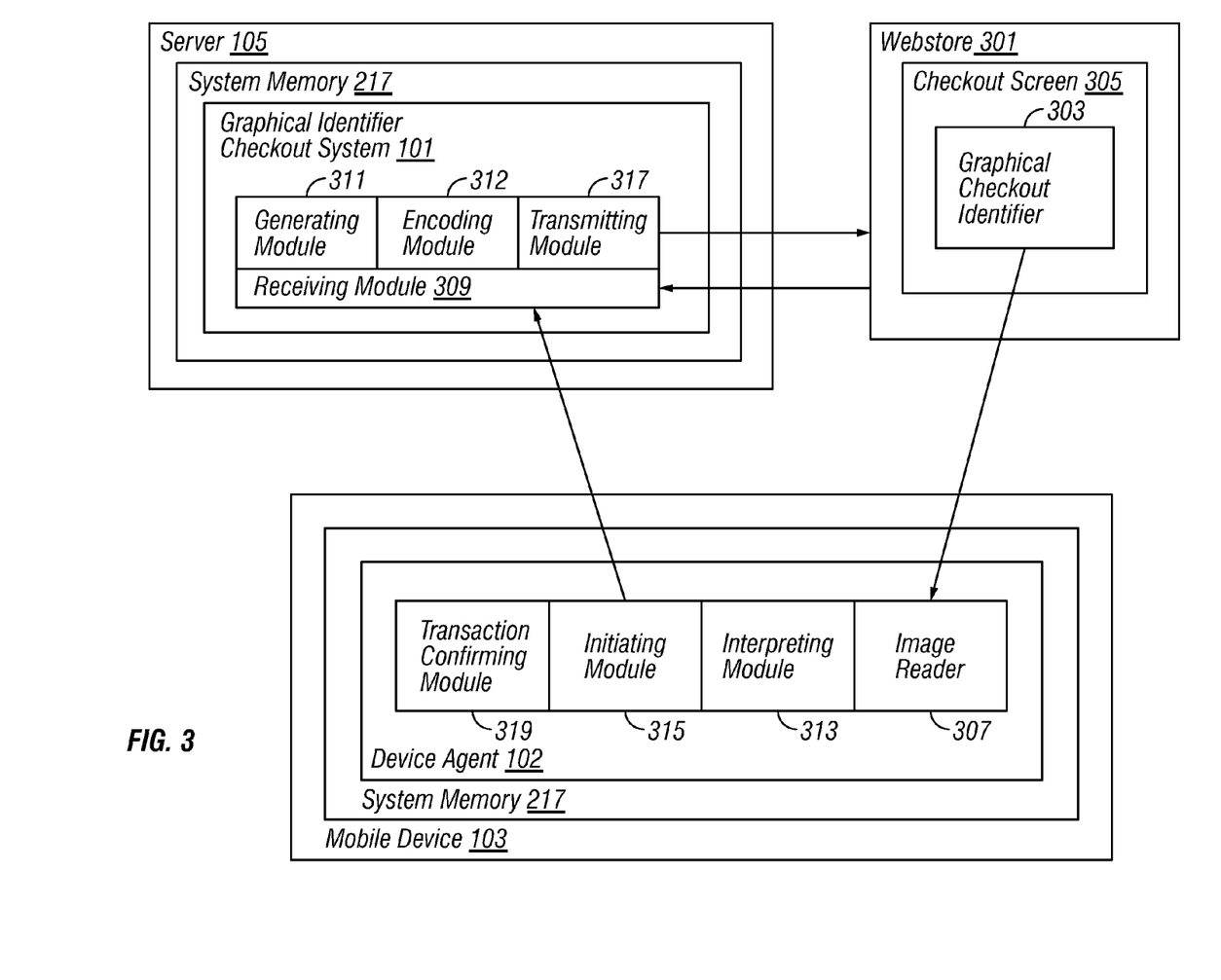
FIG. 3 is a block diagram of the operation of a graphical identifier checkout system, according to some embodiments.

FIG. 3 illustrates the operation of a device agent 102 residing in the system memory 217 of a mobile communication device 103 and a graphical identifier checkout system 101 residing in the system memory 217 of a server computer 105, according to some embodiments. As described above, the functionalities of the device agent 102 and the graphical identifier checkout system 101 can reside on a mobile communication device 103, a server 105, or be distributed between multiple computer systems 210, including within a cloud-based computing environment in which the functionality in question is provided as a service over a network 107. It is to be understood that although the device agent 102 and the graphical identifier checkout system 101 are illustrated in FIG. 3 as single entities, these components represent collections of functionalities, which can be instantiated as a single or multiple modules as desired (an instantiation of specific, multiple modules of the device agent 102 and the graphical identifier checkout system 101 are illustrated in FIG. 3). It is to be understood that the modules of the device agent 102 and of the graphical identifier checkout system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" "mobile communication device" and "computing device" mean one or more computers configured and/or programmed to execute the described functionality. Additionally, program code to implement the functionalities of the graphical identifier checkout system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the graphical identifier checkout system 101 enables an automatic webstore checkout procedure that frees users from having to manually login or enter payment and shipping information each time they make an online purchase from a webstore 301. Instead, a user completes the online checkout process via the use of a special graphical checkout identifier 303 that is displayed on the webstore's checkout screen 305. As explained in greater detail below, the graphical checkout identifier 303 is captured by an image reader 307 (e.g., digital camera, digital barcode reader, etc.) on a user's personal mobile communication device 103 (e.g., smart-phone, tablet computing device, etc.). Once the graphical checkout identifier 303 is captured, the device agent 102 running on the mobile communication device 103 interprets the graphical checkout identifier 303 as a request from the webstore 301 for checkout completion information (e.g., payment and shipping information). The device agent 102 on the mobile communication device 103 then directs the graphical identifier checkout system 101 to complete the checkout process with the webstore 301 for the user through back channels automatically, as described in more detail below. Note that providing payment information (e.g., a credit number and expiration date, a bank account number, etc.) to a webstore 301 is not the same thing as the actual execution of a payment (e.g., transferring funds by a financial institution). As used herein, the term "webstore 301" refers to an online site from which users can purchase goods or services.

In FIG. 3 the graphical identifier checkout system 101 is illustrated as residing on a server 105 which is separate from any webstore 301 with which the user completes transactions via a graphical checkout identifier 303. In other embodiments, some or all of the functionality of the graphical identifier checkout system 101 can be provided directly by a computer 210 hosting a webstore 301. However, in embodiments in which the graphical identifier checkout system 101 runs on a separate server 105 as illustrated in FIG. 3, it can be used in conjunction with multiple webstores 301. The graphical identifier checkout system 101 brokers trust between mobile communication devices 103 and webstores 301 being accessed, in order to complete checkout of users on the webstores 301.

Each user that wishes to use the graphical checkout functionality described herein obtains a mobile communication device 103 running a device agent 102. Such a user registers with the graphical identifier checkout system 101. To register the user, the graphical identifier checkout system 101 authenticates the user and identifies the user's mobile communication device 103. The graphical identifier checkout system 101 can use any conventional authentication method to authenticate the user (username and password, identification check, bank transfer, credit card authentication, etc.). To identify the specific mobile communication device 103 being operated by the authenticated user, the graphical identifier checkout system 101 can, for example, read unique identifying information such as a serial number from the installed device agent 102 or the mobile communication device 103 itself. A registered user can provide checkout completion information (e.g., real payment methods such as credit card information, bank account information and/or PayPal, shipping destinations, etc.) to the graphical identifier checkout system 101. The graphical identifier checkout system 101 stores an association between that user, the specific mobile communication device 103, and, where provided, the user's checkout completion information, so that the graphical identifier checkout system 101 can later recognize the registered user and mobile communication device 103, and process the associated checkout completion information.

A graphical checkout identifier generating module 311 of the graphical identifier checkout system 101 generates onetime use graphical checkout identifiers 303 for use by webstores 301. A graphical checkout identifier comprises an indication of a request for checkout completion information from a specific webstore 301. A graphical checkout identifier 303 can be output as a visible image that can be captured and interpreted by a mobile communication device 103 running a device agent 102. In one embodiment, graphical checkout identifiers 303 comprise renderable QR Codes that can be embedded on web pages. In addition to QR Codes, simple barcodes, 2d barcodes (3-DI, ArrayTag, Aztec Code, Codablock, Code 1, Code 16K, Code 49, ColorCode, CP Code, DataGlyphs, Data Matrix, Datastrip, Dot Code A, HCCB (Microsoft Tag), hueCode, Intacta.Code, MaxiCode, MiniCode, PDF 417, Snowflake code, SuperCode, Ultracode) and/or other computer identifiable data encoding mechanisms can be used in other embodiments. The amount of information encoded in graphical checkout identifiers 303 can vary between webstores 301 and embodiments. A graphical checkout identifier 303 can encode the identification of the webstore 301 to which it is issued, and an indication of what specific checkout completion information the webstore 301 is requesting. In other instances, a graphical checkout identifier 303 identifies the webstore 301, but the graphical identifier checkout system 101 and/or device agents 102 track what checkout completion information is requested by which webstore 301. In any case, a graphical checkout identifier encoding module 312 encodes information in a graphical checkout identifier 303 such that it can be interpreted by a device agent 102, as described below.

When a webstore 301 that supports graphical checkout identifiers 303 wishes to checkout a user (for example, at load time of a page containing a checkout screen 305), the webstore 301 issues a request to the graphical identifier checkout system 101 for a graphical checkout identifier 303. A receiving module 307 of the graphical identifier checkout system 101 on the server receives the request. In response to the received request, the graphical checkout identifier generating module 311 generates a onetime use graphical checkout identifier 303 for the webstore 301. In some instances, the request identifies the specific requested checkout completion information to encode in the graphical checkout identifier 303. In other instances, the graphical identifier checkout system 101 stores this information per webstore 301, and encodes it in the generated graphical checkout identifier 303. In yet other instances, this information is not encoded in the graphical checkout identifier 303, as noted above. In any case, a transmitting module 317 of the graphical identifier checkout system 101 transmits the generated graphical checkout identifier 303 to the requesting webstore 301. Additionally, in some embodiments the webstore 301 provides confirmation details to the graphical identifier checkout system 101 concerning the user's transaction (e.g., a description, line items in the user's cart, their prices, a total price, etc.). This information can be used to confirm the transaction with the user, as described below.

Figure 4:
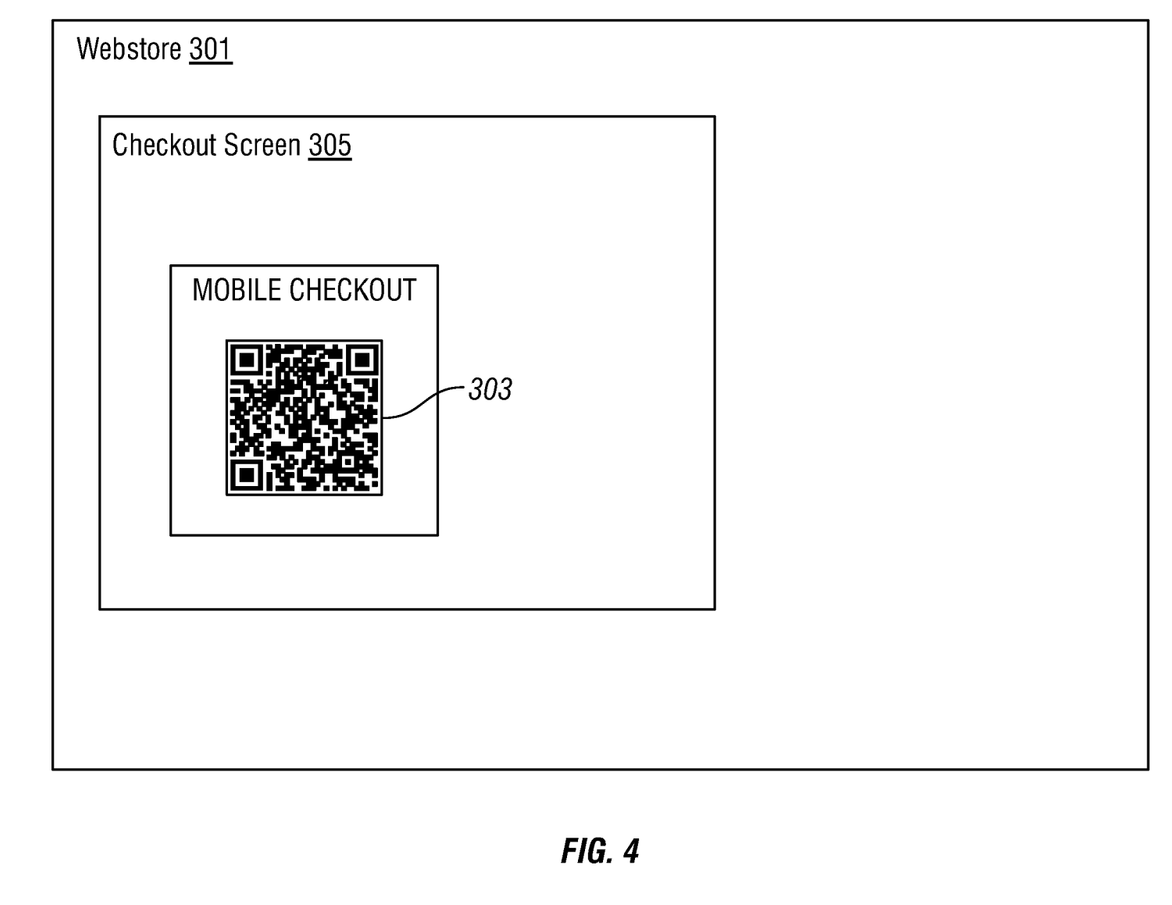
FIG. 4 is a mock screenshot of a webstore displaying a graphical checkout identifier, according to some embodiments.

The webstore 301 receives the graphical checkout identifier 303 from the graphical identifier checkout system 101, and processes it so as to display the resulting image on its checkout screen 305. In some embodiments, the only request for checkout completion by the webstore 301 is the graphical checkout identifier 303 itself. In other embodiments the graphical checkout identifier 303 is displayed in addition to a conventional prompt for at least some checkout completion information. For example, users can be given an option to checkout by manually entering checkout information or by using the graphical checkout identifier 303. FIG. 4 illustrates a checkout screen 305 of a webstore 301 displaying a graphical checkout identifier 303.

Figure 5:
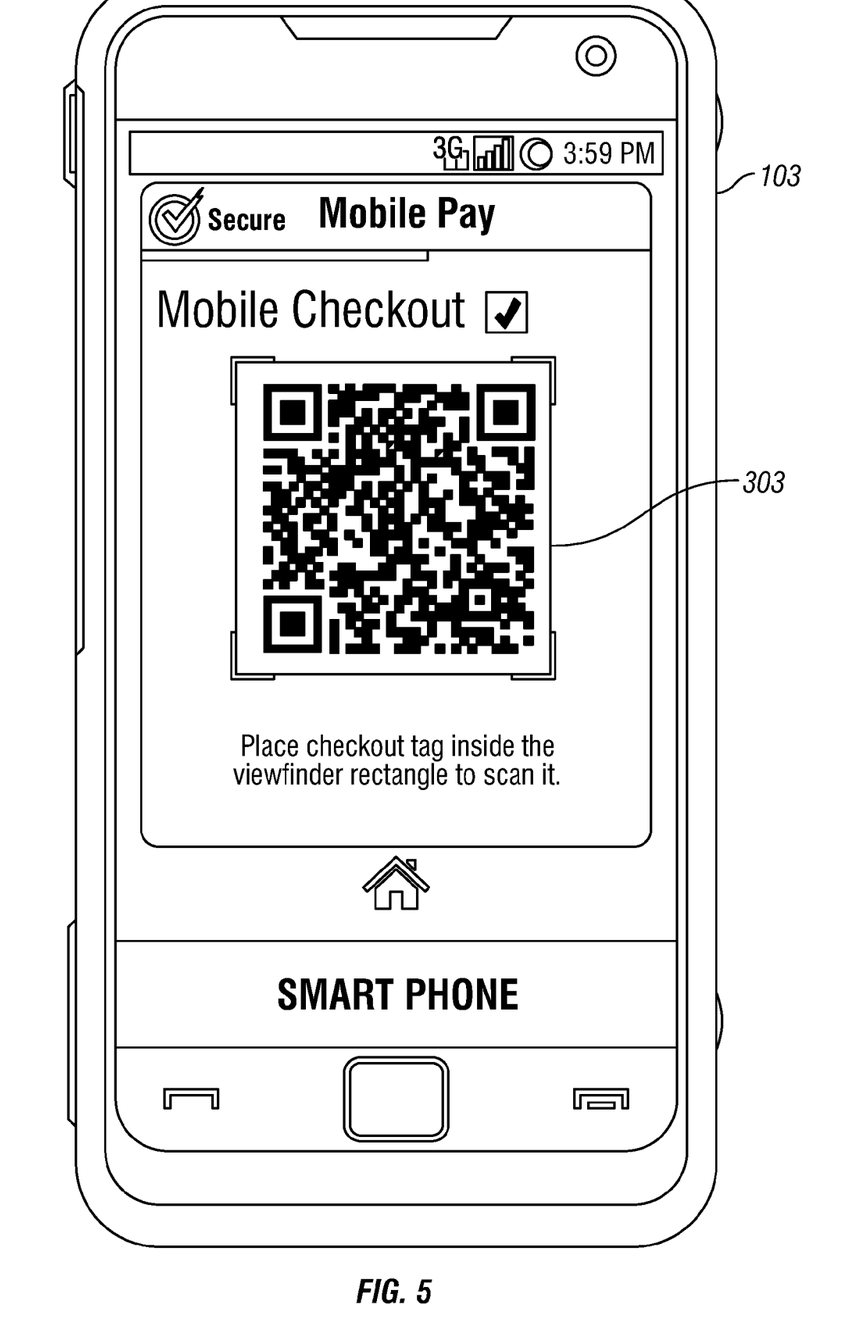
FIG. 5 is a diagram of a mobile communication device capturing a displayed graphical checkout identifier, according to some embodiments.

When a user views a webstore's checkout screen 305 containing a graphical checkout identifier 303, the user can complete the checkout automatically by using a registered mobile communication device 103. In some embodiments, the device agent 102 prompts the user to identify himself, in order to prevent unauthorized parties from using stolen mobile devices 103. This user identification can comprise entry of a four digit personal identification number (PIN), or another conventional authentication method such as a fingerprint scan, facial geometry recognition or other biometric authentication, depending on the capabilities of the mobile device 103. Once the user is identified at the mobile device level 103, the user points the image reader 307 of the mobile communication device 103 at the graphical checkout identifier 303 being displayed on the webstore's checkout screen 305, and activates the image reader 307 (e.g., takes a digital photograph of or scans the graphical checkout identifier 303). The image reader 307 captures the graphical checkout identifier 303, and a graphical identifier interpreting module 313 of the device agent interprets the information encoded therein as a request by the webstore 301 for checkout completion information. FIG. 5 shows a mobile communication device 103 capturing a graphical checkout identifier 303 according to some embodiments.

The graphical identifier interpreting module 313 interprets the information encoded in the graphical checkout identifier 303, which, as explained above, typically identifies the webstore 301 that is requesting checkout completion information and in some cases the specific checkout completion information being requested.

Figure 6:
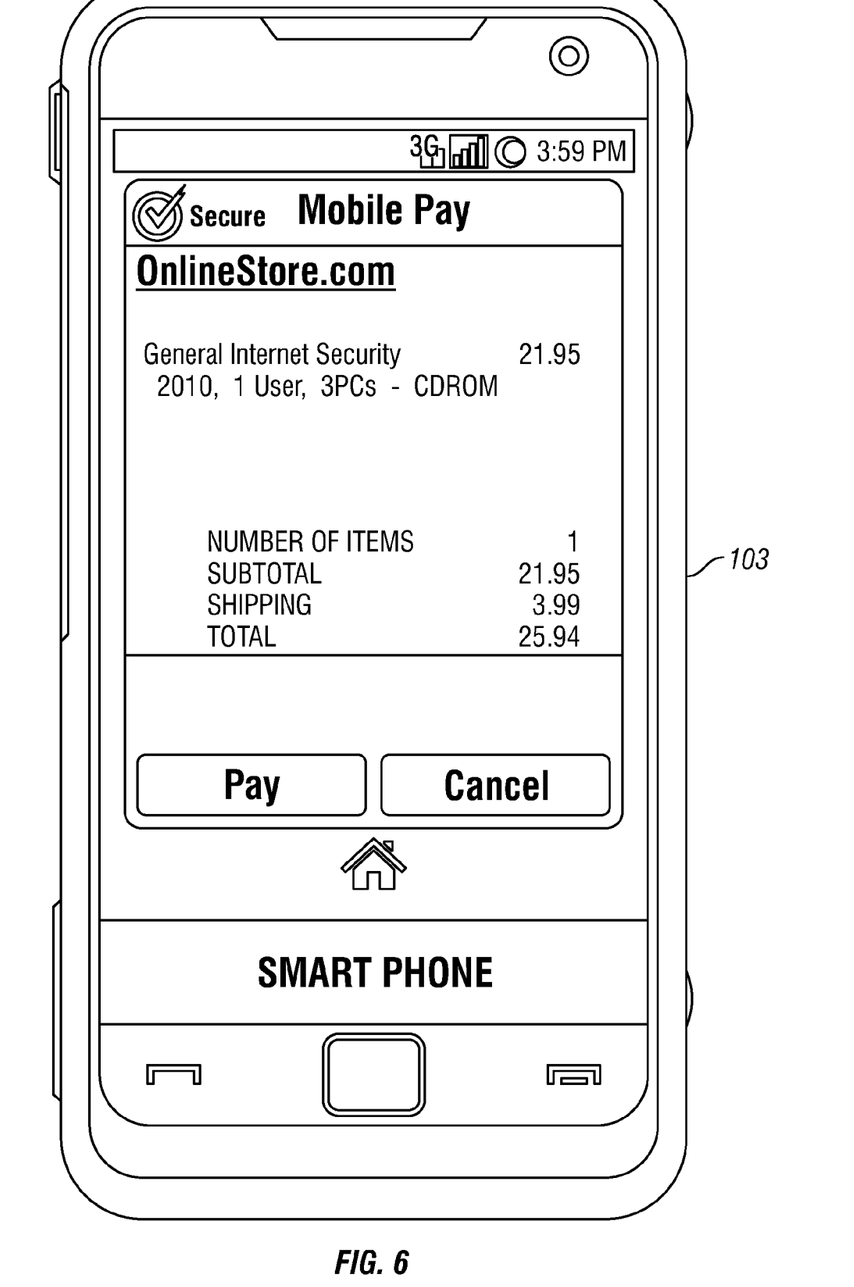
FIG. 6 is a diagram of a mobile communication device displaying a transaction confirmation, according to some embodiments.

In some embodiments, a transaction confirming module 319 of the device agent 102 displays a transaction confirmation to the user. The transaction confirmation can display as much or as little information as desired (e.g., the name of the webstore 301 and the transaction total, the complete webstore 301 invoice with the individual line items, etc.). As noted above, this type of confirmation information can be provided from the webstore 301 to the graphical identifier checkout system 101, and in turn from the graphical identifier checkout system 101 to the device agent 102. In some embodiments, the transaction confirming module 319 gives the user an option to confirm or cancel the transaction, and/or the option to select which stored payment method and/or shipping address to use (e.g., from drop down menus). FIG. 6 shows a mobile communication device 103 displaying a transaction confirmation according to some embodiments.

Once the graphical checkout identifier 303 has been interpreted (and after any optional transaction confirmation activity), an automatic checkout initiating module 315 of the device agent 102 initiates the automatic checkout of the user by the webstore 301, by communicating with the graphical identifier checkout system 101, requesting that the graphical identifier checkout system 101 automatically complete the checkout of the user on the webstore 301. The request from the mobile device 103 to automatically complete the checkout of the user is received by the receiving module 309 of the graphical identifier checkout system 101 on the server 105. In order to automatically complete the checkout of the user on the webstore 301, the transmitting module 317 of the graphical identifier checkout system 101 on the server 105 transmits the requested checkout completion information to the webstore 301, responsive to the mobile device 103 associated with the user capturing the graphical checkout identifier 303. In some cases, the automatic checkout initiating module 315 of the device agent 102 provides the requested checkout completion information to the graphical identifier checkout system 101 on the server 105. In some of these embodiments, the identification of what checkout completion information the webstore 301 is requesting is encoded in the graphical checkout identifier 303 which, as described above, is interpreted at a mobile device 103 level. In other such embodiments, the mobile device 103 tracks which webstore 301 requests what checkout completion information. In other embodiments, the graphical identifier checkout system 101 on the server 105 stores checkout completion information for registered users, and need not receive the requested information from the mobile device, but instead only the request to complete the checkout.

In any case, the transmitting module 317 automatically completes the checkout, by transmitting the requested checkout completion information to the webstore 301. This checkout completion information can be transmitted to the webstore 301 proactively in responsive to the mobile device 103 having captured the graphical checkout identifier 303, or in response to a specific request from the webstore 301 itself. Once the webstore 301 has received the checkout completion information, the webstore 301 uses the checkout completion information to complete the checkout of the user. Note that by using a graphical checkout identifier 303, the user is spared from having to manually login to the webstore 301 or enter the checkout completion information.

It is to be understood that although the capturing of the graphical checkout identifier 303 and the initiating of the automatic checkout process is described above as being performed by the mobile device 103, in some embodiments the user can be interacting with the webstore 301 from a computer system 210 other than the mobile device 103. For example, the user could be using a desktop computer 210 (not illustrated) to shop on the internet, and reach a checkout screen 305 on a webstore 301 that supports graphical checkout identifiers 303. The user could then use a registered mobile device 103 to capture the graphical checkout identifier 303 being displayed on the webstore's checkout screen 305, and the process described above would automatically complete the checkout process for the user. In some embodiments, some or all of the functionality described as being performed by the mobile device 102 can be performed by a registered non-mobile computer 210. In some embodiments, the user interacts with the webstore 301 from the mobile device 103 after checkout.

The communication between the mobile device 103 and the graphical identifier checkout system 101 on the server 105, as well as between the graphical identifier checkout system 101 on the server 105 and the various webstores 301 is typically encrypted for security. Additionally, because each graphical checkout identifier 303 is only usable one time, the communication cannot be successfully replayed. The communication between a mobile device 103 and the graphical identifier checkout system 101 on the server 105 can be conducted via SMS or other messaging services in instances where the mobile device 103 does not currently have access to the internet.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using a graphical checkout identifier to automatically checkout a user on a webstore, the method comprising the steps of:
    generating a onetime use graphical checkout identifier to be displayed by a webstore, by at least one computer;
    encoding a request for checkout completion information by the webstore in the onetime use graphical checkout identifier, by the at least one computer; and responsive to a registered user operated computing device capturing the onetime use graphical checkout identifier being displayed by the webstore, transmitting the requested checkout completion information to the webstore, by the at least one computer, such that the user is automatically checked out on the webstore, without the user manually logging in to the webstore or entering the requested checkout completion information.

2. The method of claim 1 further comprising:
receiving a request for a graphical checkout identifier from the webstore, by the at least one computer; and
transmitting the generated graphical checkout identifier to the webstore, by the at least one computer.

3. The method of claim 1 wherein encoding the request for checkout completion information in the onetime use graphical checkout identifier further comprises:
encoding an identification of specific checkout completion information being requested by the webstore, by the at least one computer.

4. The method of claim 3 wherein:
the received request for the graphical checkout identifier further identifies the specific checkout completion information being requested by the webstore.

5. The method of claim 1 further comprising:
receiving, by the at least one computer from the user operated computing device, a request to automatically complete checkout of the user on the webstore, responsive to the user operated computing device having captured the onetime use graphical checkout identifier being displayed by the webstore.

6. The method of claim 5 wherein:
the request received by the at least one computer from the user operated computing device further comprises the checkout completion information requested by the webstore.

7. The method of claim 5 wherein:
the request received by the at least one computer from the user operated computing device further identifies what specific checkout completion information is being requested by the webstore.

8. The method of claim 1 further comprising:
receiving confirmation information from the webstore concerning a transaction being conducted by the user, by the at least one computer; and
transmitting the received confirmation information concerning the transaction being conducted by the user to the user operated computing device, by the at least one computer.

9. The method of claim 1 wherein:
the user operated computing device further comprises a mobile communication device.

10. At least one non-transitory computer read storage medium storing a computer program product for using a graphical checkout identifier to automatically checkout a user on a webstore, the computer program product comprising:
program code for generating a onetime use graphical checkout identifier to be displayed by a webstore;
program code for encoding a request for checkout completion information by the webstore in the onetime use graphical checkout identifier; and
program code for, responsive to a registered user operated computing device capturing the onetime use graphical checkout identifier being displayed by the webstore, transmitting the requested checkout completion information to the webstore, such that the user is automatically checked out on the webstore, without the user manually logging in to the webstore or entering the requested checkout completion information.

11. The computer program product of claim 10 further comprising:
program code for receiving a request for a graphical checkout identifier from the webstore; and
program code for transmitting the generated graphical checkout identifier to the webstore.

12. The computer program product of claim 10 wherein the program code for encoding the request for checkout completion information in the onetime use graphical checkout identifier further comprises:
program code for encoding an identification of specific checkout completion information being requested by the webstore.

13. The computer program product of claim 12 wherein:
the received request for the graphical checkout identifier further identifies the specific checkout completion information being requested by the webstore.

14. The computer program product of claim 10 further comprising:
program code for receiving, from the user operated computing device, a request to automatically complete checkout of the user on the webstore, responsive to the user operated computing device having captured the onetime use graphical checkout identifier being displayed by the webstore.

15. The computer program product of claim 14 wherein:
the request received from the user operated computing device further comprises the checkout completion information requested by the webstore.

16. The computer program product of claim 14 wherein:
the request received from the user operated computing device further identifies what specific checkout completion information is being requested by the webstore.

17. The computer program product of claim 10 further comprising:
program code for receiving confirmation information from the webstore concerning a transaction being conducted by the user; and
program code for transmitting the received confirmation information concerning the transaction being conducted by the user to the user operated computing device.

18. A computer implemented method for using a graphical checkout identifier to automatically checkout a user on a webstore, the method comprising the steps of:
capturing, by a user operated computing device, a onetime use graphical checkout identifier being displayed by a webstore;
interpreting, by the user operated computing device, the graphical checkout identifier as a request by the webstore for checkout completion information; and
initiating, by the user operated computing device, completion of automatic checkout of the user on the webstore, without the user manually logging in to the webstore or entering the requested checkout completion information.

19. The method of 18 further comprising:
displaying, by the user operated computing device, confirmation information concerning a transaction being conducted by the user on the webstore.

20. The method of 19 further comprising:
receiving, by the user operated computing device, a confirmation from the user to complete the transaction being conducted by the user on the webstore; and
responsive to receiving the confirmation from the user, initiating completion of automatic checkout of the user on the webstore, by the user operated computing device.

* * * * *